(12) United States Patent
Yu

(10) Patent No.: US 6,760,008 B2
(45) Date of Patent: Jul. 6, 2004

(54) TWO-AXIS BALL-BASED CURSOR CONTROL APPARATUS WITH MAGNETIC FORCE INDUCED TACTILE FEEDBACK

(75) Inventor: Yat Shun Yu, British Columbia (CA)

(73) Assignee: Vtech Communications Ltd., Tai Po (HK)

( * ) Notice: Subject to any disclaimer, the term of this patent is extended or adjusted under 35 U.S.C. 154(b) by 293 days.

(21) Appl. No.: 10/059,462

(22) Filed: Jan. 29, 2002

(65) Prior Publication Data

US 2003/0142071 A1 Jul. 31, 2003

(51) Int. Cl.[7] .................................................. G09G 5/08
(52) U.S. Cl. ...................... 345/157; 345/701; 345/702
(58) Field of Search ................................ 345/157, 158, 345/160, 162, 163, 164, 167, 701, 702

(56) References Cited

U.S. PATENT DOCUMENTS

| | | | |
|---|---|---|---|
| 5,886,310 A | 3/1999 | Kataoka et al. ................ 200/14 |
| 5,894,118 A | 4/1999 | Nishimoto et al. .......... 200/527 |
| 5,952,628 A | 9/1999 | Sato et al. ....................... 200/4 |
| 6,097,964 A | 8/2000 | Nuovo et al. ................ 455/550 |
| 6,127,636 A | 10/2000 | Parvulescu et al. ........ 200/11 R |
| 6,184,480 B1 | 2/2001 | Nishimoto et al. ............. 200/4 |
| 6,194,673 B1 | 2/2001 | Sato et al. ....................... 200/4 |
| 6,198,054 B1 | 3/2001 | Janniere ...................... 200/5 R |
| 6,198,057 B1 | 3/2001 | Sato et al. ..................... 200/28 |
| 6,218,635 B1 | 4/2001 | Shigemoto et al. .......... 200/570 |
| 6,229,103 B1 | 5/2001 | Yamamoto et al. ............. 200/4 |
| 6,236,002 B1 | 5/2001 | Chou ............................. 200/4 |

Primary Examiner—Joseph Mancuso
Assistant Examiner—Shaima Q. Aminzay
(74) Attorney, Agent, or Firm—Shaw Pittman LLP

(57) ABSTRACT

A two-axis ball-based cursor control apparatus with tactile feedback is provided, which includes a housing, a spherical ball contained partially within the housing, a plurality of magnetic elements fixed within the spherical ball, and a plurality of magnetic elements fixed within the housing. When the spherical ball is at rest, an attractive magnetic force between some or all of the first magnetic elements and some or all of the second magnetic elements resists motion of the ball. When a sufficient rotational force is applied to the ball, the ball rotates about one or both axes until the applied force no longer exceeds the magnetic force, at which point the magnetic force causes the ball to stop at a new position, providing the user with tactile feedback to indicate that the ball position has changed.

20 Claims, 4 Drawing Sheets

TWO-AXIS BALL-BASED CURSOR CONTROL APPARATUS WITH MAGNETIC FORCE INDUCED TACTILE FEEDBACK

BACKGROUND OF THE INVENTION

1. Field of the Invention

The present invention relates in general to a two-axis ball-based cursor control apparatus, such as a mouse or trackball, and in particular to a cursor control apparatus which provides the user with tactile feedback corresponding to uniform incremental movements of the cursor about both axes of movement.

2. Background Art

Two-axis cursor control devices are well-known in the art. These types of devices are common components of personal computer systems used for controlling the movement of a cursor appearing on a video monitor. Cursor control devices are also finding use in handheld devices such as PDA's and cellular telephones where graphical user interfaces are manipulated by the user. Two well-known forms of such devices include the computer mouse and the trackball. A computer mouse consists of a spherical ball, approximately one-half inch in diameter and freely rotatable about two axes of rotation, mounted within a larger housing which rests on a flat surface, so that a portion of the ball protrudes from the bottom of the housing and comes into contact with the surface. Typically, a pair of rotors are positioned in contact with the ball, one aligned with each axis. Each of these rotors are in turn connected by an axle to a disk with uniformly spaced slots or holes around the outer portion thereof When the mouse is moved along the flat surface, the rotation of the ball is translated to the rotors, and in turn to the associated disks. Light emitters and sensors are positioned spanning each of the disks whereby the beam of light is alternatively passed through the disk to the sensors and then blocked from the sensors as the disk rotates. Each disk typically has two pairs of emitters and sensors associated therewith in order to determine the rate and direction of rotation of the disk. The sensors are connected to an electrical circuit which generates an electrical signal. From the signals generated by each of the two disks positioned perpendicular to one another, the direction and acceleration of the displacement of the ball, and hence of the mouse itself, is determined. This information is then translated into motion of the cursor on the screen of the computer using a predetermined relationship between the magnitude of the mouse displacement in each direction and the distance which the cursor moves in that direction. Thus, the user's horizontal and vertical movement of the mouse on the flat surface is translated into horizontal and vertical movement of the cursor on the screen.

A trackball is a similar type of cursor control apparatus in which the user merely rotates the ball itself instead of moving the entire housing. The ball typically protrudes from the top of its housing, where it can be rotated directly by the user by hand. The remainder of the device is typically substantially similar to that described above, with the rotation of the ball translated to a pair of rotors associated with each axis of rotation, and then to a pair of disks, whose motion is then translated into cursor motion by light sensors. Thus, unlike a mouse, a trackball apparatus remains stationary while the user directly rotates the ball itself.

There are, however, certain disadvantages to these types of cursor control devices. In order to achieve precise targeting of the cursor, the user must possess a certain degree of hand to eye coordination to align the cursor with the desired location. This can be troublesome in certain applications, such as pull-down menus implemented in PC graphical user interface based operating systems. Typically a single mouse click causes a number of further commands or options to appear in row after row. To select a give command or option the user must position the cursor over the text label for the desired option to execute same. Any slight movement of the device by the user will cause the cursor displayed on the screen to move to a different command or option item than that desired. Positioning is accomplished by moving the mouse or trackball, which moves in one continuous motion, until the cursor is in position. The absence of any tactile feedback corresponding to the movement of the cursor makes such precise targeting even more difficult. In addition, some devices have a tendency for the cursor to drift from its desired location because any slight or unintentional force exerted on the control device will cause it to move, and correspondingly displace the cursor from the desired location. In applications where precise targeting and control of the cursor is essential, for instance in computer aided drafting, these drawbacks are particularly unwelcome. Incorporating graphical user interfaces into smaller devices, such as cellular phones, causes potential safety issues. For example, a person using a phone in a car to recall a speed dial number using the graphical interface may cause an accident by trying to align a cursor over the display of names or numbers stored in memory.

Also known in the prior art are control devices consisting of a rotatable disk or wheel which is rotatable about only one axis in discrete, uniform increments. Examples of such devices include dials for applications such as frame-by-frame movement in a video-disc player or to switch tracks on an audio-disc player. Such devices may provide tactile feedback to the user in the form of a "clicking" or ratcheting effect which occurs when the disk or wheel is rotated. The user knows when such a device has advanced from one position to the next because of the tactile sensation triggered by the dial "snapping" into the next position. Such known devices, however, have the disadvantage of providing such incremental rotation about only one axis, therefore making them ill-suited for applications requiring control of a cursor moving in two dimensions.

It would therefore be desirable to provide a cursor control device which would allow the user to move the cursor in discrete, uniform increments in two dimensions, in order to more easily achieve precise targeting of the cursor with its intended position on the screen. Further, it would also be desirable to provide for such a device which provides tactile feedback to the user which corresponds to the movement of the cursor on the screen. In addition, it would be desirable to provide for such a device in which the unintentional motion of the cursor due to inadvertent movement of the device is minimized.

These and other objects of the present invention will become apparent to those of ordinary skill in the art in light of the present specifications, drawings, and claims.

SUMMARY OF THE INVENTION

The present invention is directed to a two-axis ball-based cursor control apparatus providing for discrete, uniform displacements in each direction of rotation in order to achieve a precise alignment of cursor and target in electronic displays, and also providing for tactile feedback corresponding to each incremental displacement. The cursor control apparatus comprises a housing, a spherical ball partially within said housing capable of freely rotating about at least two axes, a plurality of first magnetic elements within the spherical ball securely positioned relative to one another, and a plurality of second magnetic elements fixed within the housing. The second magnetic elements are positioned so that, when the spherical ball is at rest, an attractive magnetic force exists between one or more of the first magnetic elements and one or more of the second magnetic elements, in order to maintain the spherical ball at rest until a rotational force greater than the attractive force is applied to it by the user. When such a force is applied, the ball rotates about at least one axis until such time as the applied force no longer exceeds the attractive force, at which time the attractive force causes the spherical ball to come to a stop at a new stationary position. This provides the user with tactile feedback indicating that the position of the spherical ball has changed.

In one embodiment, each of the first magnetic elements is composed of a magnetically responsive material, such as ferrous metal, and each of the second magnetic elements is composed of a permanent magnet or electromagnet. It is deemed within the scope of the present invention to utilize any material or combination of materials provided that they are attracted to one another by magnetic force. In a second embodiment, each of the first magnetic elements is composed of a permanent magnet and each of the second magnetic elements is composed of a magnetically responsive material, such as a ferrous metal. In a third embodiment, each of the first magnetic elements and each of the second magnetic elements are composed of permanent magnets, with the first and second elements positioned so that when a first magnetic element and a second magnetic element come into close proximity with one another, the ends of each which are nearest to one another are of opposite polarity, thereby attracting one to the other.

In a preferred embodiment, the cursor control apparatus also comprises a means for measuring the displacement of the spherical ball about each axis of rotation. This may comprise a plurality of rotors adjacent to the spherical ball, and an axle and a rotating disk associated with each rotor. The rotors are positioned so as to transfer the rotational motion of the spherical ball about one axis of rotation to the corresponding rotating disk. This embodiment also comprises at least one electronic sensor associated with each rotating disk for measuring the direction and magnitude of the rotation of the rotating disks and for providing a signal to the associated electronic device, which changes the position of the cursor.

In another embodiment of the invention, the spherical ball further comprises a stabilizer which provides an additional force to maintain the spherical ball in a stationary position. This stabilizer may comprise an arm extending from said housing and a rotor attached to the arm which is positioned so as to exert a force on the surface of the spherical ball biasing the ball toward the two rotors.

A further embodiment includes a plurality of pivoting members within the spherical ball, each of which contains one of the first magnetic elements. The pivoting members are allowed to pivot in order to maintain a uniform separation between the first magnetic elements and the second magnetic elements when the spherical ball is stationary.

In another embodiment, the invention further comprises at least one switch element for allowing the user to select options corresponding to particular cursor locations on an electronic display screen. This at least one switch element may comprise at least one button element which is manipulated directly by pressure applied thereto by the user in order to trigger the switch element. The at least one switch element may also be positioned so as to come into contact with the spherical ball when pressure is applied to the spherical ball by the user, causing the spherical ball to depress the switch element, thereby triggering the switch element.

In the event that an electromagnet is utilized, the user may be provided with the option of disconnecting the power to the electromagnet such that the present device can operate as a conventional cursor control apparatus providing for continuous movement and reconnecting the power to operate the present apparatus with tactile feedback.

DETAILED DESCRIPTION OF THE INVENTION

Figure 1:
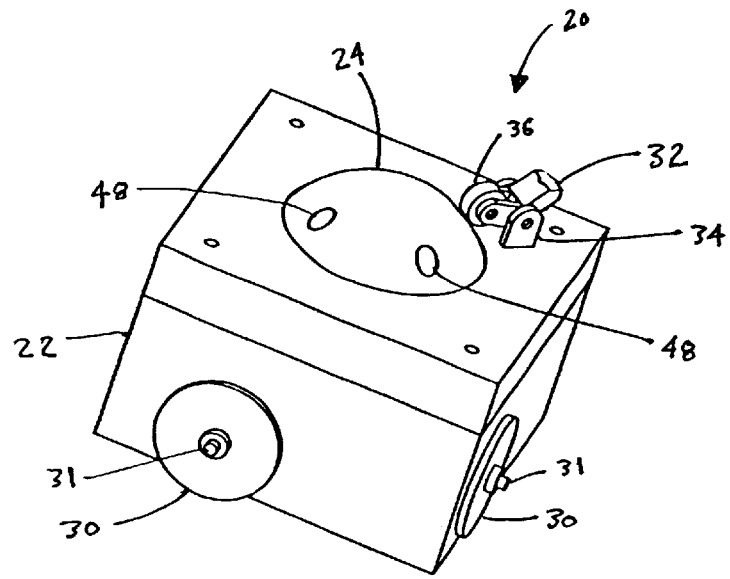
FIG. 1 is a perspective view of a cursor control apparatus according to the present invention.
Figure 2:
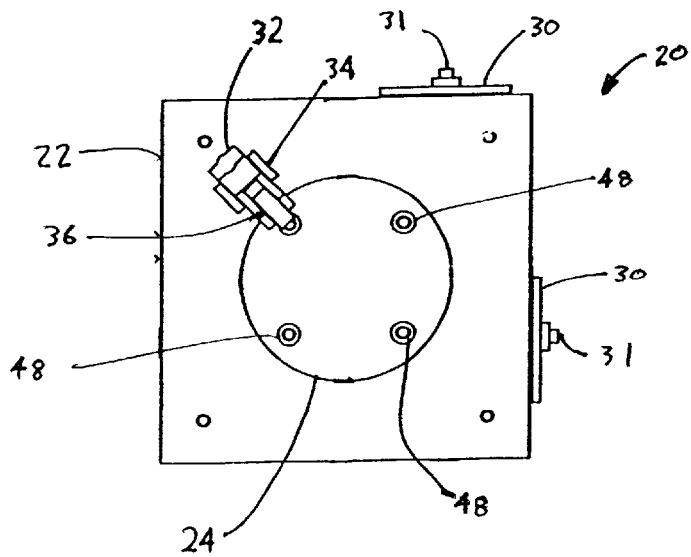
FIG. 2 is a top view of the cursor control apparatus shown in FIG. 1.
Figure 3:
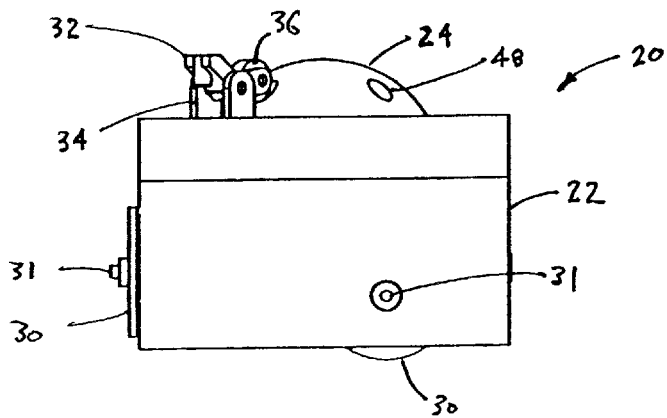
FIG. 3 is a left elevational view of the cursor control apparatus shown in FIG. 1.

While this invention is susceptible of embodiment in many different forms, there are shown in the drawings and will be described herein one specific embodiment, with the understanding that the present disclosure is to be considered as an exemplification of the principles of the invention and is not intended to limit the invention to the embodiment illustrated.

Two-axis ball-based cursor control apparatus with tactile feedback 20 is shown in FIGS. 1–4 as including outer housing, 22, spherical ball 24, second magnetic elements 26, rotor 28, rotor disks 30, and stabilizer 32. Cursor control apparatus 20 is intended for use in controlling the movement of a cursor on electronic display screens, including cathode-ray screens, such as those commonly found in computers, and liquid crystal displays of the type commonly used in hand-held electronic devices, such as personal digital assistants (PDAs), cellular telephones, and the like. Cursor control apparatus 20 is designed to provide cursor motion in two directions in discrete, uniform increments, along with tactile feedback to the user corresponding to each increment of motion. The size of the desired increments of motion can vary depending on the type of device in which the apparatus is used. For instance, if cursor control apparatus 20 is used in a hand-held device with a small liquid crystal display, each increment of cursor motion may correspond to one pixel on the display screen. If, on the other hand, cursor control apparatus 20 is used with a conventional computer monitor with dimensions of thousand of pixels in length and width, then each increment of cursor motion may correspond to many pixels.

Figure 4:
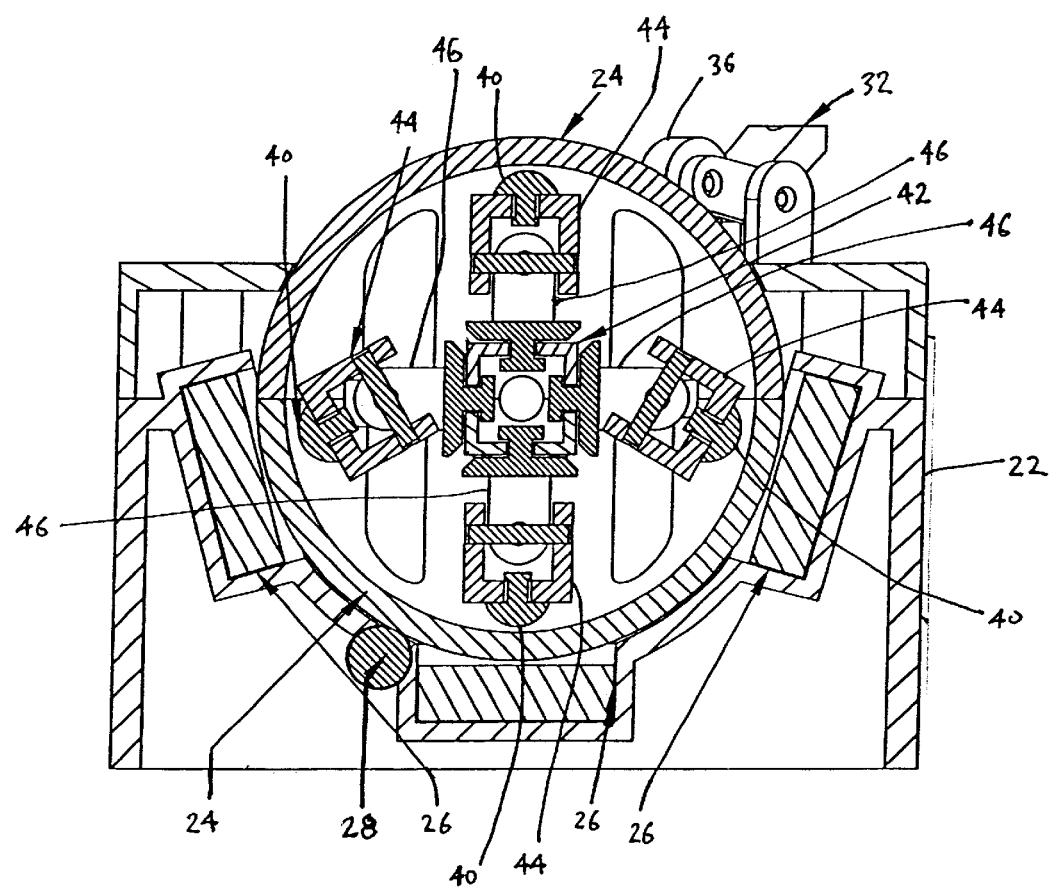
FIG. 4 is a cross-sectional view of the cursor control apparatus shown in FIG. 1, showing the interior of the spherical ball portion.

Spherical ball 24 is shown as including first magnetic elements 40, central bushing 42, universal joints 44, arms 46, and screw holes 48. Spherical ball 24, shown in cross-section in FIG. 4, is symmetrical about each of the three principal axes. Central bushing 42 is fixed in place at the center of spherical ball 24. One arm 46 extends in either direction from central bushing 42 along each of the three principal axes, resulting in a total of six arms 46. Affixed to the end of each arm 46 in the embodiment illustrated is a universal joint 44, each of which contains a first magnetic element 40, which is attracted by one of second magnetic elements 26 when in proximity therewith. In an alternative embodiment, the universal joints 44 can be omitted, and first magnetic elements 40 may be fixed in place relative to spherical ball 24, as described below. Screw holes 48 are provided for joining the component parts of spherical ball 24 together by means of several screws.

It is contemplated that first magnetic elements 40 and second magnetic elements 26 will be composed of materials which will give rise to an attractive magnetic force between the two of sufficient strength to retard motion of spherical ball 24 when one of first magnetic elements 40 and one of second magnetic elements 26 come into close proximity with one another. For example, each of first magnetic elements 40 may be composed of a magnetically responsive material, such as a ferrous metal and each of second magnetic elements 26 may be composed of a permanent magnet. Alternatively, each of first magnetic elements 40 may be composed of a permanent magnet and each of second magnetic elements 26 may be composed of a magnetically responsive material, such as ferrous metal. Additionally, each of first magnetic elements 40 and second magnetic elements 26 may be composed of a permanent magnet, with the first and second elements positioned so that when a first magnetic element 40 and a second magnetic element 26 come into close proximity with one another, the ends of each which are nearest to one another are of opposite polarity, thereby generating an attractive magnetic force between them.

Second magnetic elements 26 are fixed within housing 22, adjacent to the outer surface of spherical ball 24, such that the distance between second magnetic elements 26 and first magnetic elements 40 is at a minimum when spherical ball 24 is stationary. In this orientation, an attractive force exists between second magnetic elements 26 and first magnetic elements 40 which tends to keep spherical ball 24 at rest. The present embodiment includes five second magnetic elements 26, three of which are shown in FIG. 4 (the remaining two are located out of the cross-section plane). However, the number of second magnetic elements 26 can vary depending on the space constraints imposed by the size of housing 22 and the desired magnitude of the attractive force between the second magnetic elements 26 and the first magnetic elements 40. As the number (or strength) of second magnetic elements 26 is increased, the total attractive force increases. As a result, cursor control apparatus 20 becomes more resistant to inadvertent rotation of spherical ball 24, and the accompanying undesired motion of the cursor, due to the fact that the user must exert more force in order to rotate spherical ball 24 to overcome the attractive force between the second magnetic elements 26 and the first magnetic elements 40.

In order to move the cursor, the user rotates spherical ball 24 about one or both of its axes of rotation by exerting a rotational force on the portion of spherical ball 24 extending out of housing 22. Initially, spherical ball 24 is in a stable position due to the forces of attraction between first magnetic elements 40 and second magnetic elements 26. When a force is exerted on spherical ball 24 which exceeds the combined forces of attraction at that instant, spherical ball 24 will begin to rotate about one or both of its axes. Spherical ball 24 will then quickly "snap" to the next stable position due to the decrease and subsequent increase in the attractive forces as each first magnetic element 40 approaches the next second magnetic element 26. This snapping effect will provide the user with tactile feedback which indicates that the cursor has moved another increment in the direction of motion of spherical ball 24.

The number of first magnetic elements 40 corresponds to the number of increments of cursor motion for each revolution of spherical ball 24, and can be varied as desired. The configuration of the present embodiment provides that each increment of cursor motion requires one-quarter revolution of spherical ball 24 by the user. As seen in FIG. 4, the portion of spherical ball protruding from the opening in housing 22 contains about one-third of the circumference of spherical ball 24. This configuration, therefore, allows the user to rotate spherical ball 24 through one increment of cursor motion, or one-quarter revolution, without removing his/her fingers from the surface of spherical ball 24. Such a configuration is well-suited for applications in which it is anticipated that the typical number of desired increments of cursor motion at any one time will be small, such as in small liquid crystal displays having relatively few pixels. However, for applications in which the number of desired increments of cursor motion at any one time is significantly larger, a configuration in which spherical ball 24 contains a greater number of first magnetic elements 40 would be optimal, as it would result in more increments of cursor motion for each revolution of spherical ball 24.

In the current embodiment, each of second magnetic elements 26 (except for the one on the bottom side of spherical ball 24) are offset downward from the axes of rotation of spherical ball 24. This allows a larger portion of spherical ball 24 to extend out of the opening in housing 22, providing more surface area for the user to manipulate spherical ball 24. This configuration, however, requires a means for adjusting the position of first magnetic elements 40 in order to provide for a stable position of spherical ball 24 when at rest. Accordingly, universal joints 44 are used to allow first magnetic elements 40 to rotate about arms 46. As a result, the distance between each of second magnetic elements 26 and its corresponding first magnetic element 40 when spherical ball 24 is at rest is substantially identical, resulting in a more stable rest position, which minimizes the possibility of inadvertent cursor motion. Without the presence of universal joints 44, the distances, and hence the attractive forces, between first magnetic elements 40 and second magnetic elements 26 would vary, resulting in a less stable rest position of spherical ball 24, and increasing the possibility of inadvertent cursor motion.

Rotor 28 is positioned in contact with spherical ball 24 so that the rotational motion of spherical ball 24 about one axis is transferred to rotor 28. Cursor control apparatus 20 includes another substantially similar rotor (not shown) which is positioned so as to reflect rotation about the second axis of rotation of spherical ball 24. This rotation is then transferred to rotor disks 30 by means of axles 31. The rotational motion of spherical ball 24 about its two axes can then be determined in a conventional manner based on the direction and magnitude of rotation of rotor disks 30, for example through sensors using beams of light to measure the rotational displacement of rotor disks 30, as is well known in the art of computer mice.

In this embodiment of the invention, spherical ball 24 is also held in the stationary position by stabilizer 32, which takes the form of an arm 34 extending from the top of housing 22 with an attached rotor 36 held against the top of spherical ball 24, preferably by a spring-loaded mechanism.

Cursor control apparatus 20 preferably also includes button or switch elements allowing the user to make selections in conjunction with the position of the cursor on the screen. These elements may take any of several forms, including buttons such as those found on the top side of a conventional computer mouse and/or a switch element located beneath spherical ball 24 which is activated by pressing down on spherical ball 24, thereby depressing the switch element.

Figure 5:
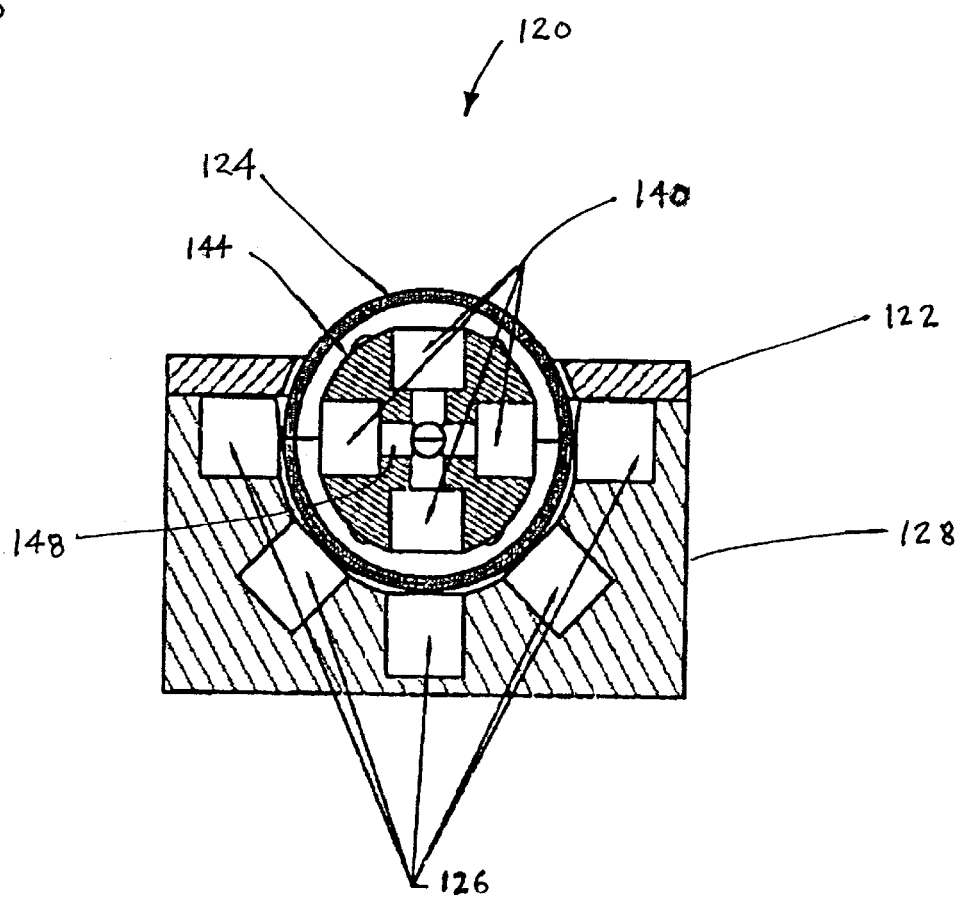
FIG. 5 is a cross-sectional view of a cursor control apparatus according to another embodiment of the invention, in which the first magnetic elements are fixed in place relative to the spherical ball.
Figure 6:
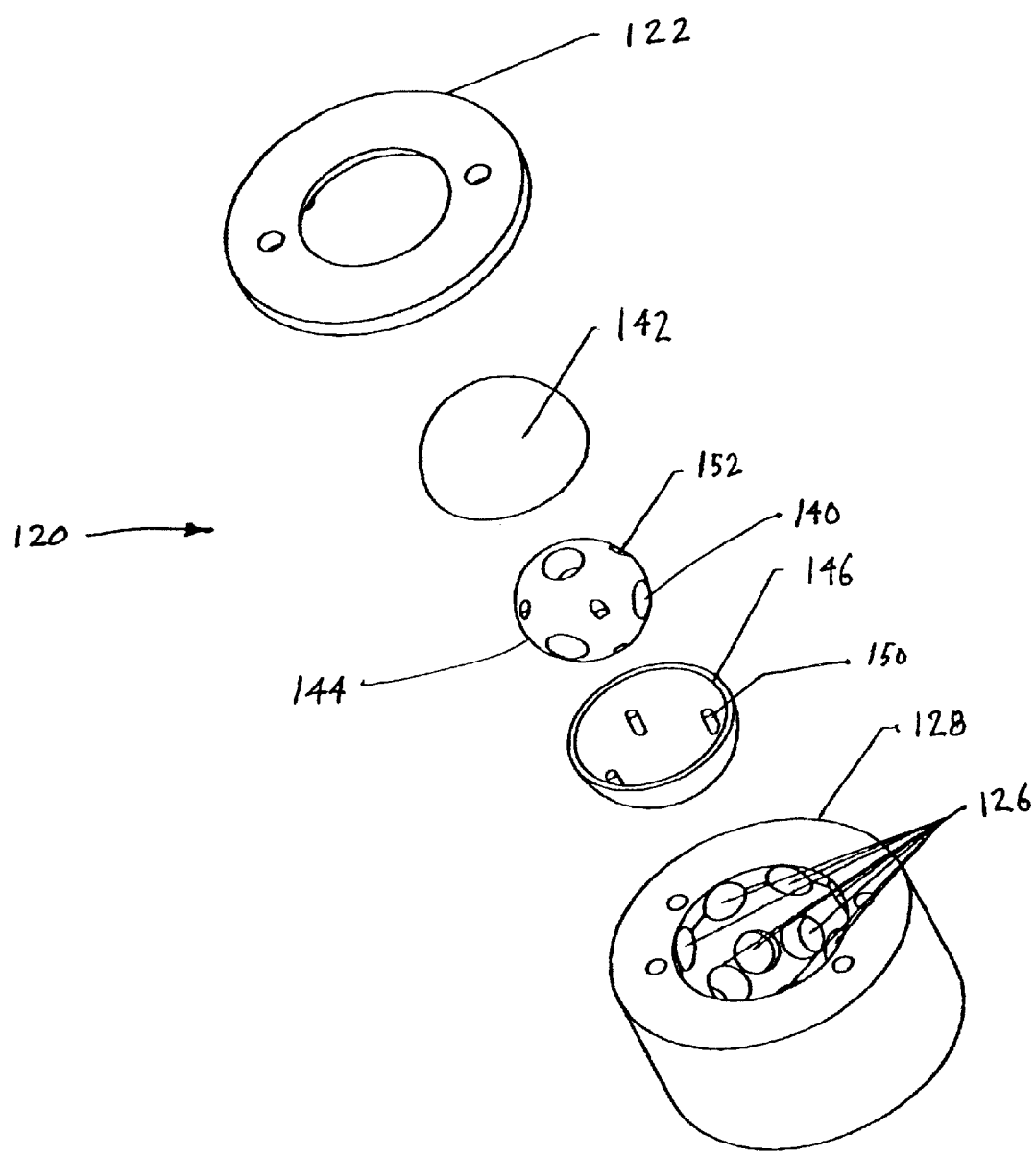
FIG. 6 is an exploded perspective view of the cursor control apparatus shown in FIG. 5.

In an alternative embodiment of the invention shown in FIGS. 5 and 6, the universal joints are eliminated, and first magnetic elements 140 are fixed in place relative to spherical ball 124. In this embodiment, cursor control apparatus 120 is shown in FIG. 6 as including top housing portion 122, spherical ball 124, second magnetic elements 126, and bottom housing portion 128. Cursor control apparatus 120 also includes a pair of rotors and corresponding rotor disks (not shown) for translating the rotation of spherical ball 124 into cursor motion, in a similar fashion as the previous embodiment.

Spherical ball 124 is shown in FIG. 6 as including first magnetic elements 140, top half 142, inner core 144, bottom half 146, and posts 150. Top half 142 and bottom half 146 are preferably joined together by means of screws, as in the previous embodiment, or by an adhesive. First magnetic elements 140 are held within inner core 144, as shown in FIG. 5, which serves to hold each of first magnetic elements 140 in place relative to one another. Inner core 144 is in turn held in place by posts 150, which interact with holes 152 on inner core 144 to prevent inner core 144 from rotating relative to top half 142 and bottom half 146.

As shown in FIG. 5, this embodiment of the invention contains a larger number of second magnetic elements 126 than does the previous embodiment. As a result, this configuration provides that each increment of cursor motion requires only one-eighth revolution of spherical ball 124, which is the amount of rotation required for spherical ball 124 to transition from one stable position to the next. Thus, each full revolution of spherical ball 124 will generate eight increments of cursor motion. This is contrasted with the previous embodiment, in which each increment of cursor motion required one-quarter rotation, thereby generating four increments of motion per revolution.

Additional second magnetic elements 126 may be added or removed as desired in order to provide for different numbers of increments per revolution of spherical ball 124. However, several factors exert a practical limit on the number of second magnetic elements 126 which may be added. The first of these is size, as the magnitude of the magnetic force generated by the interaction between first magnetic elements 140 and second magnetic elements 126 depends in part on the size of each. As they are reduced in size, the corresponding reduction in strength of the magnetic force generated will serve to minimize the amount of tactile feedback provided to the user. Also, as second magnetic elements 126 are added, the interval between stable positions of spherical ball 124 is reduced. At a certain point, the interval between each stable position will become so small that the user is not able to discern between movements of one increment and multiple increments.

The foregoing description and drawings are merely to explain and illustrate the invention, and the invention is not limited thereto except insofar as the independent claims are so limited, as those skilled in the art with the present disclosure before them will be able to make modifications and variations therein without departing from the scope of the invention.

What is claimed is:

1. A two-axis ball-based cursor control apparatus providing for discrete, uniform displacements in each direction of rotation in order to achieve a precise alignment of a cursor and target in electronic displays while simultaneously providing tactile feedback to the user corresponding to each incremental displacement, said cursor control apparatus comprising:

a housing;

a spherical ball positioned partially within said housing and capable of freely rotating about at least two axes;

a plurality of first magnetic elements fixed within said spherical ball; and a plurality of second magnetic elements fixed within said housing, said second magnetic elements positioned so that when said spherical ball is at rest, an attractive magnetic force exists between at least one of said first magnetic elements and at least one of said second magnetic elements sufficient to thereby restrict further rotation of said spherical ball until a rotational force is applied to said spherical ball sufficient to overcome the magnetic force, causing said spherical ball to rotate about at least one axis of rotation until such time as the applied force on said spherical ball no longer exceeds the magnetic force, at which time said attractive force will again cause said spherical ball to stop at a new stationary position, toward providing the user with tactile feedback indicating that the position of said spherical ball has changed.

2. The two-axis cursor control apparatus according to claim 1, wherein each of said first magnetic elements is composed of a magnetically responsive material and each of said second magnetic elements is composed of a permanent magnet, such that said first magnetic elements and said second magnetic elements are capable of exerting an attractive force on one another.

3. The two-axis cursor control apparatus according to claim 1, wherein each of said first magnetic elements is composed of a magnetically responsive material and each of said second magnetic elements is composed of an electromagnet, such that said first magnetic elements and said second magnetic elements are capable of exerting an attractive force on one another.

4. The two-axis cursor control apparatus according to claim 1, wherein each of said first magnetic elements is composed of a permanent magnet and each of said second magnetic elements is composed of a magnetically responsive material, such that said first magnetic elements and said second magnetic elements are capable of exerting an attractive force on one another.

5. The two-axis cursor control apparatus according to claim 1, wherein each of said first magnetic elements and each of said second magnetic elements is composed of a permanent magnet, with said first magnetic elements and said second magnetic elements positioned so that when one of said first magnetic elements and one of said second magnetic elements come into close proximity with one another, the ends of each which are nearest to one another are of opposite polarity, thereby generating an attractive magnetic force between said one of said first magnetic elements and said one of said second magnetic elements.

6. The two-axis cursor control apparatus according to claim 1, further comprising a means for measuring the displacement of said spherical ball about each axis of rotation.

7. The two-axis cursor control apparatus according to claim 6, wherein said means for measuring the displacement of said spherical ball about each axis of rotation comprises a plurality of rotors adjacent to said spherical ball, an axle associated with each of said rotors, and a rotating disk associated with each of said axles, each of said rotors positioned so as to transfer the rotational motion of said spherical ball about one axis of rotation to the corresponding rotating disk by means of the corresponding axle.

8. The two-axis cursor control apparatus according to claim 6, further comprising at least one electronic sensor associated with each of said rotating disks for measuring the direction and magnitude of the rotation of said rotating disks and providing a signal to an associated electronic device, said signal serving to change the position of a cursor on an associated display screen.

9. The two-axis cursor control apparatus according to claim 1, further comprising a stabilizer to provide an additional force on said spherical ball to maintain said spherical ball in a stationary position.

10. The two-axis cursor control apparatus according to claim 9, wherein said stabilizer comprises an arm extending from said housing and a rotor attached to said arm, said rotor positioned so as to exert a force on the surface of said spherical ball.

11. The two-axis cursor control apparatus according to claim 1, wherein said spherical ball further includes a plurality of pivoting members positioned within the interior of said ball, each of said pivoting members containing at least one of said first magnetic elements, such that said first magnetic elements pivot in order to maintain a uniform separation between said first magnetic elements and said second magnetic elements when said spherical ball is in a stationary position.

12. The two-axis cursor control apparatus according to claim 1, further comprising at least one switch element for allowing the user to select options corresponding to particular cursor locations on an electronic display screen.

13. The two-axis cursor control apparatus according to claim 12, wherein said at least one switch element comprises at least one button element which is manipulated directly by pressure applied thereto by the user, triggering said switch element.

14. The two-axis cursor control apparatus according to claim 12, wherein said at least one switch element is positioned so as to contact said spherical ball when pressure is applied to said spherical ball by the user, causing said spherical ball to depress said switch element, thereby triggering said switch element.

15. A cursor control apparatus, comprising:
a housing;
a spherical ball positioned partially within the housing and capable of freely rotating about at least one axis;
a rotor in contact with the spherical ball, wherein the rotor is configured to determine rotational movement of the spherical ball about the axis;
one or more of first magnetic elements fixed within the spherical ball; and
one or more of second magnetic elements fixed within the housing,
wherein the second magnetic elements are positioned so that when the spherical ball is at rest, an attractive magnetic force exists between at least one of the first magnetic elements and at least one of the second magnetic elements sufficient to thereby restrict further rotation of the spherical ball until a rotational force is applied to the spherical ball sufficient to overcome the magnetic force, causing the spherical ball to rotate about the axis until such time as the applied force on the spherical ball no longer exceeds the magnetic force, at which time the attractive force will again cause the spherical ball to stop at a new stationary position, toward providing the user with tactile feedback indicating that the position of the spherical ball has changed.

16. The apparatus of claim 15, further comprising a stabilizer to provide an additional force on the spherical ball to maintain the spherical ball in a stationary position.

17. The apparatus of claim 16, wherein the second axis is perpendicular to the first axis.

18. The apparatus according to claim 16, wherein the stabilizer comprises an arm extending from the housing and a rotor attached to the arm, the rotor positioned so as to exert a force on the surface of the spherical ball.

19. The apparatus of claim 15, further comprising:
a second rotor in contact with the spherical ball, wherein the second rotor is configured to determine rotational movement of the spherical ball about a second axis,
wherein the second magnetic elements are positioned so that when the spherical ball is at rest, an attractive magnetic force exists between at least one of the first magnetic elements and at least one of the second magnetic elements sufficient to thereby restrict further rotation of the spherical ball until a rotational force is applied to the spherical ball sufficient to overcome the magnetic force, causing the spherical ball to rotate about the second axis until such time as the applied force on the spherical ball no longer exceeds the magnetic force, at which time the attractive force will again cause the spherical ball to stop at a new stationary position, toward providing the user with tactile feedback indicating that the position of the spherical ball has changed.

20. A cursor control apparatus, comprising:
a housing;
a spherical ball positioned partially within the housing and capable of freely rotating about at least two axes;
at least two rotors in contact with the spherical ball, wherein each of the at least two rotors is configured to determine rotational movement of the spherical ball about each of the at least two axes;
a plurality of first magnetic elements fixed within the spherical ball; and
a plurality of second magnetic elements fixed within the housing,
wherein the second magnetic elements are positioned so that when the spherical ball is at rest, an attractive magnetic force exists between at least one of the first magnetic elements and at least one of the second magnetic elements sufficient to thereby restrict further rotation of the spherical ball until a rotational force is applied to the spherical ball sufficient to overcome the magnetic force, causing the spherical ball to rotate about at least one of the axes until such time as the applied force on the spherical ball no longer exceeds the magnetic force, at which time the attractive force will again cause the spherical ball to stop at a new stationary position, toward providing the user with tactile feedback indicating that the position of the spherical ball has changed.

* * * * *